United States Patent [19]

Brand

[11] Patent Number: 4,674,354
[45] Date of Patent: Jun. 23, 1987

[54] COLLAPSIBLE STEERING COLUMN

[76] Inventor: Harold E. Brand, 11039 Fenway, Sun Valley, Calif. 91352

[21] Appl. No.: 787,725

[22] Filed: Oct. 15, 1985

[51] Int. Cl.⁴ ............................................. B62D 1/18
[52] U.S. Cl. ...................................... 74/492; 74/555; 280/777
[58] Field of Search .................... 74/492, 555, 552; 188/371; 280/777, 779

[56] References Cited

U.S. PATENT DOCUMENTS

| | | | |
|---|---|---|---|
| 2,197,317 | 4/1940 | Ratner | 74/552 |
| 3,461,740 | 8/1969 | Tajima et al. | 280/777 |
| 3,468,182 | 9/1969 | Shwartzberg | 280/777 |
| 3,483,768 | 12/1969 | Glass | 74/492 |
| 3,545,300 | 12/1970 | Furusho | 74/492 |
| 3,597,993 | 8/1971 | Ripley | 74/492 |
| 3,923,319 | 12/1975 | Nonaka et al. | 280/777 |

FOREIGN PATENT DOCUMENTS 354940 12/1932 Italy ....................................... 74/492

Primary Examiner—Cornelius J. Husar
Assistant Examiner—Peter M. Cuomo
Attorney, Agent, or Firm—Roger A. Marrs

[57] ABSTRACT

An automobile steering column is disclosed herein having a fixed cylindrical housing enclosing a rotatable steering mechanism composed of a pair of telescoping sections joined in a slidable and shock absorbing splined connection. A steering wheel is carried on the end of one column section by a yieldable and resilient coupling member adapted to collapse under pressure when the column section to which it is attached has reached its limit of sliding travel. A limit stop is provided operable between the end of the housing and the hub of the steering wheel.

1 Claim, 5 Drawing Figures

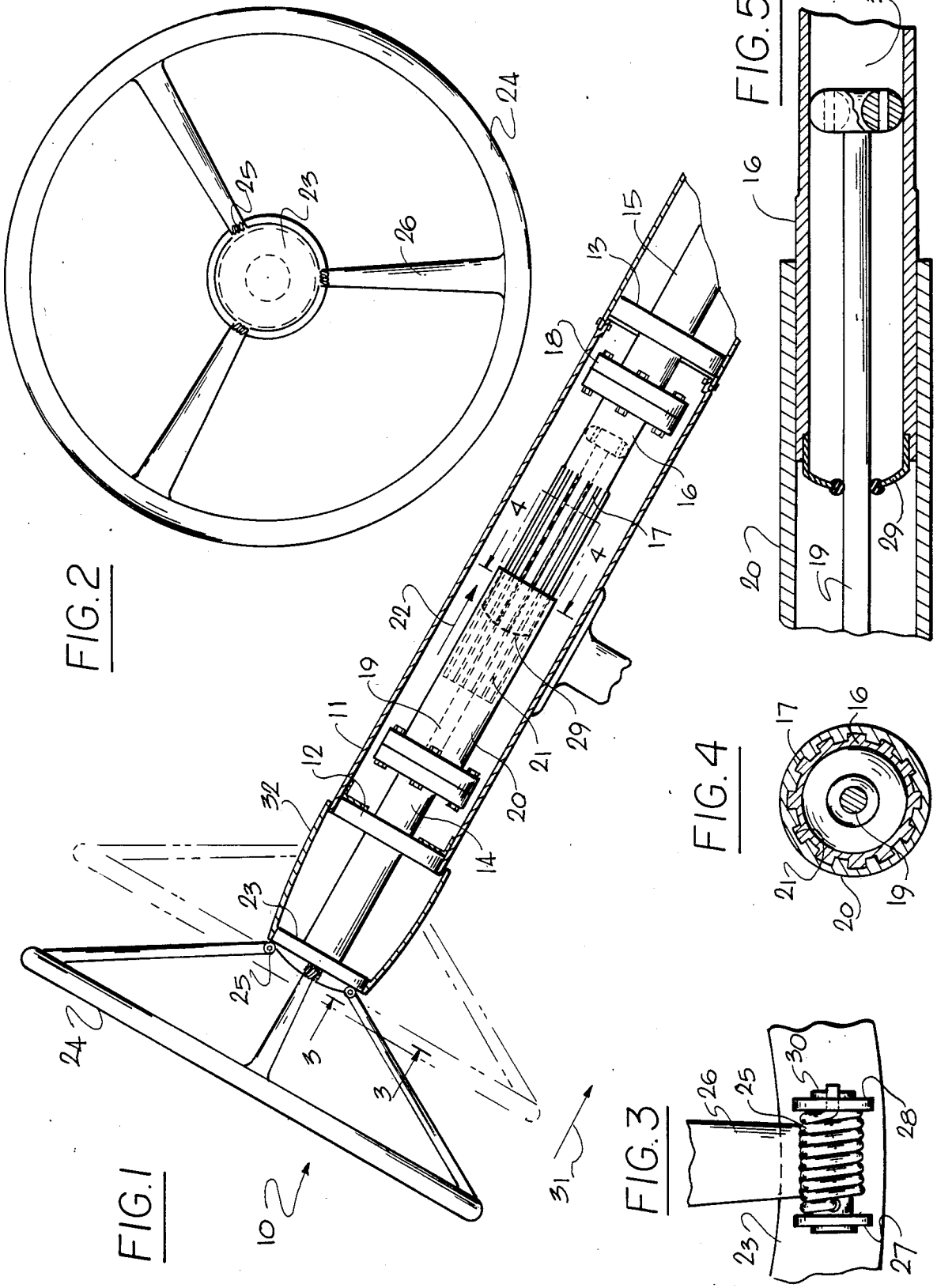

COLLAPSIBLE STEERING COLUMN

BACKGROUND OF THE INVENTION

1. Field of the Invention

The present invention relates to automobile steering columns and more particularly to a novel collapsible steering column adapted to reduce its overall length during an accident to protect the driver of the vehicle.

2. Brief Description of the Prior Art

In the past, it has been the conventional practice to construct automobiles with fixed columns having a steering wheel attached to one end normally held by the driver of the vehicle. During impact such as when encountering an accident or collision, the momentum of the driver causes his body to be forced against the steering wheel which causes severe injuries due to the fact that the steering column and the wheel are rigid and non-collapsible. Although some attempts have been made to avoid this problem, difficulties have been encountered which stem largely from the fact that the length of travel of any collapsible steering column must be significant in order to absorb shock. Also, shock absorbers do not normally provide the necessary length of movement required to reduce shock in such circumstances.

Although some attempts have been made in the past to absorb or compensate for this shock, these efforts usually reside only in collapsing the steering wheel itself or collapsing the steering column itself. By incorporating hydraulic or gas shock-absorbing cylinders into the steering column, complexities are encountered which greatly restrict the driver's ability to maneuver the vehicle via the steering column and attempts to merely resiliently attach the steering wheel to the column have not resulted in adequate protection.

Therefore, a long-standing need has existed to provide a novel safety steering column for a vehicle adapted to permit movement of the steering column so as to shorten its length while simultaneously permitting collapsing of the steering wheel to absorb shock in order to protect the driver of the vehicle during an auto accident.

SUMMARY OF THE INVENTION

Accordingly, the above problems and difficulties are obviated by the present invention which provides a novel safety steering column for vehicles comprising an elongated and fixed housing enclosing a steering column having a pair of elongated sections joined together by a slidable and shock absorbing splined means whereby rotary movement of an upper section of the pair translates into rotatable movement by the lower end of the pair. Also, the splined coupling means permits rectilinear movement between the two sections within a pre-selected limit of travel. The upper section of the pair of steering column sections is employed to carry the steering wheel held by the hands of the driver. The steering wheel is coupled to the section by a resilient and yieldable means adapted to absorb shock and permit the collapsing of the steering wheel over a portion of the steering column when the travel limits of the telescoping column sections have been reached.

Therefore, it is among the primary objects of the present invention to provide a novel collapsible and slidable steering column combination for use in vehicles to protect the driver during an accident or collision.

Another object of the present invention is to provide a novel collapsible and slidable steering column combination employing a resiliently mounted steering wheel to one end of a pair of telescoping column sections which are coupled by means of a sliding and shock absorbing splined relationship.

Another object of the present invention is to provide a novel safety steering column for vehicles which will provide impact protection to a driver upon encountering of the vehicle in an accident.

Still a further object of the present invention is to provide a novel two-part steering column coupled together in sliding and shock absorbing relationship and which includes a yieldable steering wheel mounted on the end thereof and wherein the steering column comprising the telescoping sliding sections are carried in a housing which includes limits for setting the range of sliding relationship.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a longitudinal cross-sectional view of the novel steering column incorporating the present invention;

FIG. 2 is a top plan view of the steering column showing the steering wheel attached thereto;

FIG. 3 is an enlarged sectional view taken in the direction of arrows 3—3 of FIG. 1 illustrating the yieldable connection between the steering wheel and the steering column;

FIG. 4 is an enlarged transverse cross-sectional view of the telescoping relationship between the pair of column sections and taken in the direction of arrows 4—4 of FIG. 1; and FIG. 5 is an enlarged sectional view of the shock absorbing splined connection as taken in the direction of arrows 4—4 thereof.

DESCRIPTION OF THE PREFERRED EMBODIMENT

Referring to FIG. 1, the novel steering column of the present invention is illustrated in the general direction of arrow 10 which includes an elongated housing 11 having spacers 12 and 13 which mount a pair of steering column sections 14 and 15. The end of section 15 terminates in a portion 16 having a plurality of splines outwardly projecting in a radiating manner and which are illustrated in general by the numeral 17. The section 15 is rigidly attached to the portion 16 by means of a rigid coupling 18.

The section 14 terminates in a cylindrical portion 20 which includes a plurality of grooves located on its inside diameter and collectively indicated by numeral 21 which are in a sliding relationship with the splines 17 on the portion 16. This relationship is more clearly illustrated in FIG. 4. It can be seen that the spline connection between the portions 20 and 16 provide a coupling which permits rectilinear movement as indicated by numeral 22 as well as rotational movement so that steering is effected. The portion 16 is maintained in a stationary position by means of its coupling 18 to the section 15 so that the portion 20 and section 14 will slide from the position shown in solid lines to the position shown in broken lines over the portion 16.

Shock absorbing sections 16 and 20 are shown in FIG. 5 having a fixed rod 19 extending through a domed head 29 carried on the end of section 16. The rod terminates with a toroidal damper for restricted metering of a fluid or gas within a chamber 33.

The overtravel movement of portion 20 with regard to portion 16 beyond the range of shock absorption is limited by means of engagement between the opposing surfaces of a hub 23 and the stationary spacer 12.

In further reference to FIGS. 1, 2, and 3, it can be seen that the hub 23 carries a steering wheel 24. The resilient, yieldable and shock absorbing means 25 takes the form of a spring which is more clearly seen in FIG. 3 that constricts between fixtures 27 and 28 on the hub 23 about a shaft 30 carried at the end of spoke 26. A similar spring arrangement connects the opposite end of each spoke to the wheel 24. Therefore, as pressure is exerted on the steering wheel 24 by the driver in the event of a collision, movement of the steering wheel is in the direction of arrow 31 so that the wheel moves to the position shown in broken lines in FIG. 1. The collapsing movement of the steering wheel is over the hub 23 and its sleeve or skirt 32. However, it is to be understood that the collapsing movement of the steering wheel will not normally take place until engagement of the hub 23 with the fixed spacer 12 serving as a limit stop. Movement of the steering wheel in the direction of arrow 31 will cause the sliding spline coupling to permit the steering column section 14 to move in the direction of arrow 22. When the hub 23 reaches the spacer 12, collapsing of the steering wheel from the solid line position to the broken line position in FIG. 1 will be effected.

Primary shock absorption is obtained by damper and metered fluid in cylindrical portion 16 which is splined with section 20 in telescoping relationship to translate rotational movement therebetween.

From the foregoing, it can be seen that the novel steering column of the present invention will permit rotation of the steering wheel 24 to be translated into a rotary movement of the steering section 15 via the section 14 and the splined connection between portions 20 and 16 respectively. The sliding movement of the sections with respect to one another is stopped when engagement of the hub 23 engages with the spacer 12. At this time, additional pressure on the steering wheel 24 in the direction of arrow 31 will collapse the steering wheel over the hub 23 and its sleeve or skirt 32 to the position shown in broken lines in FIG. 1. Normal steering is unaffected by the construction and the linear movement of steering column section 14 with respect to section 15 will only occur upon the exertion of pressure by the driver on the steering wheel 24 such as would be experienced in the event of an accident.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A collapsible steering column for a vehicle comprising:
   an elongated stationary housing;
   an elongated steering shaft having an overall length supported in said housing;
   said steering shaft consisting of a pair of coaxial column sections having ends arranged in end-to-end relationship;
   coupling means including shock absorbing means movably joining said adjacent column section ends together adapted to selectively reduce said overall length of said steering shaft;
   a steering wheel attached to the end of one of said column sections;
   said coupling means comprises a sliding, telescoping connection between said adjacent section ends constituting a ram and cylinder shock absorbing relationship including a splined connection therebetween for translating rotary movement therebetween;
   additional shock absorption means including contracted resilient means movably securing said steering wheel to said one column section;
   said resilient means is at least three coil springs equally spaced apart in coaxial relationship with respect to said steering shaft;
   said shock absorbing means includes a cylindrical portion having internal V-shaped grooves open at one end to insertably receive a plurality of wedge-shaped ridges carried on the opposing end of said column section other than said aforementioned one column section;
   said ridges slidably engaged with said grooves;
   said shock absorbing means further including a damper coaxially fixed within said cylindrical portion extending through said aforementioned one column section;
   limit means cooperatively carried between said housing and said steering column section carrying said steering wheel for limiting the sliding movement of said one column section with respect to said other column section;
   said coupling means transmits rotational movement from one column section to said other column section via said shock absorber cylinder portion.

* * * * *